United States Patent
Franz et al.

(10) Patent No.: US 12,187,750 B2
(45) Date of Patent: Jan. 7, 2025

(54) BICYCLIC TRIOLBORATE AND USE THEREOF IN AN ELECTROLYTE COMPOSITION IN AN ENERGY STORE

(71) Applicant: TECHNISCHE UNIVERSITÄT DARMSTADT, Darmstadt (DE)

(72) Inventors: Klaus-Dieter Franz, Kelkheim (DE); Barbara Albert, Darmstadt (DE); Stefanie Dolique, Darmstadt (DE); Claire Förster, Hanau (DE)

(73) Assignee: TECHNISCHE UNIVERSITÄT DARMSTADT, Darmstadt (DE)

( * ) Notice: Subject to any disclaimer, the term of this patent is extended or adjusted under 35 U.S.C. 154(b) by 718 days.

(21) Appl. No.: 17/599,201

(22) PCT Filed: Mar. 25, 2020

(86) PCT No.: PCT/EP2020/058348
§ 371 (c)(1),
(2) Date: Sep. 28, 2021

(87) PCT Pub. No.: WO2020/200957
PCT Pub. Date: Oct. 8, 2020

(65) Prior Publication Data
US 2022/0194966 A1    Jun. 23, 2022

(30) Foreign Application Priority Data
Mar. 29, 2019   (DE) .......................... 102019108288.9

(51) Int. Cl.
C07F 5/04        (2006.01)
C07F 5/02        (2006.01)
H01G 11/62       (2013.01)
H01G 11/64       (2013.01)
H01G 11/60       (2013.01)

(52) U.S. Cl.
CPC .............. C07F 5/025 (2013.01); C07F 5/04 (2013.01); H01G 11/62 (2013.01); H01G 11/64 (2013.01); H01G 11/60 (2013.01)

(58) Field of Classification Search
CPC ...................................................... C07F 5/04
See application file for complete search history.

(56) References Cited

U.S. PATENT DOCUMENTS 8,563,761 B2 * 10/2013 Armand ............ H01M 10/0567
558/290
2010/0087646 A1 * 4/2010 Miyaura .................... C07F 5/02
558/290
2011/0171112 A1 7/2011 Armand et al.

FOREIGN PATENT DOCUMENTS

WO 2009122044 A2 10/2009
WO 2014073378 A1 5/2014
WO 2014117028 A1 7/2014
WO 2015007659 A1 1/2015

OTHER PUBLICATIONS

American Chemical Society (ACS), CAS Registry, entry S 97464-86-3/RN, Aug. 4, 1985, 4 pages.
Yamamoto, Y., et al., "Cyclic Trioborates: Air- and Water-Stable Ate Complexes of Organoboronic Acids", Angew. Chem. Int. Ed., 2008, pp. 928-931, vol. 47, Wiley-VCH Verlag GmbH & Co. KGaA, Weinheim, XP55072727A.
Sobabe, Y., et al., "Synthesis of Aryl Triolborates via Nickel-Catalyzed Borylation of Aryl Halides with 5-(tert-Butyldimethylsiloxymethyl)-5-methyl-1,3,2-dioxaborinane", Synthesis, 2012, pp. 1233-1236, vol. 44, George Thieme Verlag Stuttgart, NY.
Huang, W., et al., "Synthesis of 1-substituted 2,6,7-trioxa-4-phospha-1-borabicyclo[2.2.2]octan-1-uide", Synthetic Communications, 2016, pp. 1182-1186, vol. 46, No. 14, Taylor & Francis Group.
Arbuzov, B.A., et al., "Pyridinium 1-phenyl-3,5,8-tris(trichloromethyl-1-boronata-2,6,7-trioxa-4-phosphabicyclo[2.2.2]octane", 1985, retrieved from STN, Abstract No. Database accession No. 1985:471398, Chemical Abstracts Service, Columbus, Ohio, XP002799478.
Litvinov, I. A., et al., "Molecular and crystal structure of pyridinium 2S,6S,7S-tris(trichloromethyl)-4-phenyl-1-phospha-3,5,8-trioxa-4-boratabicyclo[2.2.2]octane", 1989, rectrieved from STN, Abstract No. Database accession No. 1989:95362, Chemical Abstracts Service, Columbus, Ohio, XP002799479.
Nikonov, G. N., et al., "Reactions of [.alpha.-[boryloxy)alkyl](.alpha.-hyroxyalkyl)phosphines and their derivatives with bases", 1989, retrieved from STN, Abstract No. Database accession No. 1989:95362, Chemical Abstracts Service, Columbus, Ohio, XP002799480.
Ignateva, S. N., et al., "Synthesis of cyclic boryloxyalkylphosphines wiht electron-acceptor substituents", 1986, retrieved from STN, Abstract No. Database accession No. 1986:68942, Chemical Abstracts Service, Columbus, Ohio, XP002799481.

* cited by examiner

*Primary Examiner* — Laura L Stockton
(74) *Attorney, Agent, or Firm* — Hudak, Shunk & Farine Co. LPA

(57) ABSTRACT

A bicyclic triolborate of the general formula

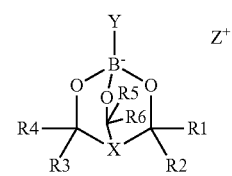

and its use in an electrolyte composition. The use of a bicyclic triolborate in an electrolyte composition in electrochemical supercapacitors, such as for example in double-layer capacitors in electric motors.

12 Claims, 3 Drawing Sheets

BICYCLIC TRIOLBORATE AND USE THEREOF IN AN ELECTROLYTE COMPOSITION IN AN ENERGY STORE

FIELD OF THE INVENTION

The present invention relates to a bicyclic triolborate and its use in an electrolyte composition. In particularly, the present invention relates to the use of a bicyclic triolborate in an electrolyte composition in electrochemical supercapacitors, such as for example in double-layer capacitors in electric motors.

BACKGROUND OF THE INVENTION

Electromobility requires high-performance energy storage systems. Rapid load changes in electromobile systems lead to a drop in power and to a shortening of the service life of electrochemical energy storage facilities. Therefore, high-performance electrical storage buffers are needed to relieve the load on electrochemical energy storage facilities in electromobile systems. For vehicles with electric motors, novel materials are needed for energy storage facilities with higher performance. The desired new materials should guarantee a fast and permanent availability of driving energy. In particularly, new electrolyte compositions in capacitors with increased storage capacity and power would be desirable.

With electrochemical supercapacitors an efficient storage and conversion of energy in electric motors is possible. Here, in electromobility in particularly electrochemical double-layer capacitors (EDLC) are used. The charge capacity and the performance of supercapacitors are significantly influenced by the electrolyte composition. The electrolyte compositions provided to date in supercapacitors are mainly based on strongly acidic or basic aqueous salt solutions. However, the electrolyte compositions provided to date have a limited charge capacity, a limited electrochemical window and an undesirable thermal expansion, when heated. In addition, electrolyte compositions provided to date in supercapacitors are characterized by the fact that a relatively high proportion of solvent is used. This reduces the proportion of conductive ions, which has a negative influence onto the conductivity of the energy storage facility. Furthermore, the ions provided to date in electrolyte compositions have an undesirably high reactivity. This leads to undesirable reactions of the ions with the solvent of the electrolyte composition or with the surface of the electrode. This reduces the performance and the lifetime of the energy storage facility. The provision of a novel electrolyte composition to overcome these disadvantages would be desirable.

For example, WO 2015/007659 A1 describes the use of reactive lithium tetraalkoxy borates in electrolytes. Here, the electrolyte composition contains the reactive lithium tetraalkoxy borates only as an additive. In particular, the electrolyte composition comprises a high proportion of 60-99.98% by weight of solvent and a low proportion of conductive salts. As a result, the performance of an energy storage facility remains limited. In addition, the electrolyte composition contains ions which may have an undesirably high reactivity.

SUMMARY OF THE INVENTION

Therefore, an object of the present invention is to overcome the disadvantages of prior art. In particularly, it is an object to provide a novel electrolyte salt and a novel electrolyte composition for the use in energy storage facilities, in particularly in supercapacitors. The electrolyte composition should in particularly by characterized by an increased charge capacity, wherein the electrolyte composition should be able to be produced from readily available raw materials and at low cost.

The objects are solved by the subject matter of the patent claims. The objects are in particularly solved by a bicyclic triolborate according to claim 1, Furthermore, they are solved by the use of bicyclic triolborates in an electrolyte composition in an energy storage facility, in particularly a capacitor.

In particularly, the bicyclic triolborates and electrolyte compositions according to the present invention are characterized by 1) a high electrolyte concentration and/or ion density, 2) a low viscosity for low internal resistance, 3) a wide voltage window together with high electrochemical stability and 4) a small effective radius for close electrode contact. In addition, they can be produced in a simple and cost-effective manner. A great advantage of the bicyclic triolborate salts is that with the substituent patterns at the cation or along the main axis of the cage molecule the properties 1) - 4) can be varied and can be optimized according to the respective application. Thus, there are diverse possibilities of adaptation which the conducting salts and electrolyte compositions used up to now do not offer.

According to the present invention, the bicyclic triolborate has the following general structure (formula 1):

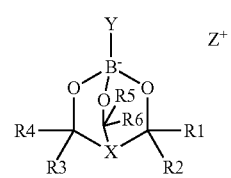

formula 1 wherein R1 to R6 independently of each other are selected from hydrogen, hydroxy, nitro, halide group or substituted or unsubstituted hydroxyalkyl, alkyl, isoalkyl, alkenyl, aryl, heteroaryl, cycloalkyl, haloalkyl, alkoxy, alkoxycarbonyl, phenyl, naphthyl group;

wherein X is selected from nitrogen, phosphorus and carbon, wherein the carbon may be substituted with hydrogen, nitro, halide group or substituted or unsubstituted hydroxyalkyl, alkyl, isoalkyl, alkenyl, aryl, heteroaryl, cycloalkyl, haloalkyl, alkoxy, alkoxycarbonyl, phenyl, naphthyl group;

wherein Y is selected from hydrogen, hydroxy, cyano, nitro, halide group or substituted or unsubstituted hydroxyalkyl, alkyl, isoalkyl, alkenyl, aryl, heteroaryl, cycloalkyl, haloalkyl, alkoxy, alkoxycarbonyl, phenyl, naphthyl group; wherein $Z^+$ is an ion of the general formula $R'_nA+$ with n=1-4.

Preferably, the bicyclic triolborate comprises a counterion $R'_nA^+$, wherein A is selected from the group comprising nitrogen and phosphorus. Furthermore, the substituents R are preferably selected from hydrogen, linear or branched alkyl groups or linear or branched haloalkyl groups, particularly preferably from linear alkyl groups or linear haloalkyl groups.

In particularly, the 1-4 R' in the formula $R'_nA^+$ can be up to four different alkyl substituents, wherein the residual substituents may be hydrogen atoms.

It is also possible that two of the substituents in $R'_nA^+$ are replaced by a bridging cyclic group R1", wherein R2" or R3"

are two alkyl groups or one hydrogen and one alkyl group, and wherein then $A^+$ only carries three substituents (formula 2):

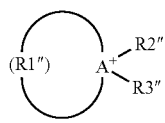

formula 2

It is also possible that the $Z^+$ ion on $A^+$ instead of the 1-4 R' contains two bridging (cyclic) alkyl groups (R1''', R2''') (spiro cation, formula 3).

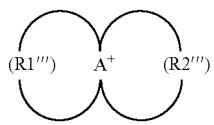

formula 3

Furthermore, the $Z^+$ ion can be an imidazolium cation of the type $R_3^{IV}Z^+$ (formula 4). Here, the three substituents $R^{IV}$ can be selected from the same substituents as R'.

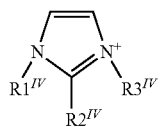

formula 4

Preferably, independently of each other, the substituents R1 to R6 in formula 1 can be hydrogen, an alkyl group or a haloalkyl group. The alkyl groups are preferably an alkyl group with 1-12 carbon atoms, further preferably an alkyl group with 1-6 carbon atoms, further preferably an alkyl group with 1-5 carbon atoms, further preferably an alkyl group with 1-4 carbon atoms, further preferably an alkyl group with 1-3 carbon atoms, further preferably an alkyl group with 1-2 carbon atoms, further preferably a methyl group. The haloalkyl groups are preferably a haloalkyl group with 1-12 carbon atoms, further preferably a haloalkyl group with 1-6 carbon atoms, further preferably a haloalkyl group with 1-5 carbon atoms, further preferably a haloalkyl group with 1-4 carbon atoms, further preferably a haloalkyl group with 1-3 carbon atoms, further preferably a haloalkyl group with 1-2 carbon atoms, further preferably a halomethyl group.

Smaller groups result in a spherically ellipsoid molecular geometry of the bicyclic triolborate. So, the melting temperature and the viscosity of the electrolyte composition are lowered. This results in a higher conductivity of the electrolyte composition. Furthermore, the molecular geometry results in a steric shielding of the charge center against Coulomb interactions. As a result of this, the arrangement of the ions in the electric field is facilitated, so that a better charge distribution is achieved. Too large substituents at the sides of the molecule, in addition, complicate the penetration into porous surface structures of the electrodes.

In a particularly preferable embodiment, R1 to R6 in formula 1 are hydrogen.

Preferably, X is a carbon substituted with hydrogen; furthermore, X is preferably a carbon substituted with an alkyl group, further preferably with an alkyl group with 1-12 carbon atoms, further preferably with an alkyl group with 1-6 carbon atoms, further preferably with an alkyl group with 1-5 carbon atoms, further preferably with an alkyl group with 1-4 carbon atoms, further preferably with an alkyl group with 1-3 carbon atoms, further preferably with an alkyl group with 1-2 carbon atoms, further preferably with a methyl group, or with a haloalkyl group, further preferably with a haloalkyl group with 1-12 carbon atoms, further preferably with a haloalkyl group with 1-6 carbon atoms, further preferably with a haloalkyl group with 1-5 carbon atoms, further preferably with a haloalkyl group with 1-4 carbon atoms, further preferably with a haloalkyl group with 1-3 carbon atoms, further preferably with a haloalkyl group with 1-2 carbon atoms, still further preferably with a halomethyl group.

Smaller groups result in a spherically ellipsoid molecular geometry of the bicyclic triolborate. So, the melting temperature and the viscosity of the electrolyte composition are lowered. This results in a higher conductivity of the electrolyte composition. Furthermore, the molecular geometry results in a steric shielding of the charge center against Coulomb interactions. As a result of this, the arrangement of the ions in the electric field is facilitated, so that a better charge distribution is achieved. In particularly, the steric shielding results in a reduction of interionic interactions. This results in an improved mobility of the ions in the electrolyte composition and in the electric field. Generally, a high ion concentration results in increased interionic interactions and thus in a reduced ionic mobility and viscosity. By the steric shielding of the charge centers through the substituents in the electrolyte composition according to the present invention, also in the case of a high ion concentration, a high ionic mobility is maintained. In particularly, also the proportion of the solvent can be reduced and thus the effective ion radius, which in turn results in a closer contact of the ions with the electrode surface and according to the Coulomb interaction in a corresponding gain in capacity. On the other hand, non-substituted ions, in particularly metal ions, and here in particularly alkali metal ions, show high interionic interactions. Therefore, in particularly in the case of higher concentrations of alkali metal ions, for the shielding high proportions of solvent are necessary for the formation of solvate shells. However, this results in a reduced viscosity of the electrolyte composition. Through the selection of the groups of the ions according to the present invention it is not only possible to lower the ionic mobility and the viscosity, but also to adjust them in a targeted manner.

It is most preferable, when X (formula 1), when it is a carbon, is not substituted with an aryl group, in particularly a phenyl group or naphthyl group. Groups having a large spherical molecular geometry result in an unfavorable arrangement of the ions in the electric field.

In a certain preferred embodiment X is a carbon which is substituted with a $C_1$-$C_4$ group.

In another preferred embodiment X is a carbon which carries hydrogen as a group.

In further advantageous embodiments X is preferably nitrogen, furthermore preferably phosphorus.

Preferably, Y in formula 1 is hydrogen, further preferably an alkyl group, further preferably an alkyl group with 1-12 carbon atoms, further preferably an alkyl group with 1-6 carbon atoms, further preferably an alkyl group with 1-5 carbon atoms, further preferably an alkyl group with 1-4 carbon atoms, further preferably an alkyl group with 1—3 carbon atoms, further preferably an alkyl group with 1-2 carbon atoms, further preferably a methyl group, further preferably a haloalkyl group, further preferably a haloalkyl group with 1-12 carbon atoms, further preferably a haloalkyl group with 1-6 carbon atoms, further preferably a haloalkyl group with 1-5 carbon atoms, further preferably a haloalkyl group with 1-4 carbon atoms, further preferably a haloalkyl group with 1-3 carbon atoms, further preferably a haloalkyl group with 1-2 carbon atoms, further preferably a halomethyl group.

Also here, groups having a linear molecular geometry result in the advantageous spherically ellipsoid molecular geometry of the bicyclic triolborate. The consequences thereof have already been explained above in connection with the substituent X. For this, in particularly, the substituents on X and Y which are arranged in the longitudinal axis of the molecule are decisive.

The haloalkyl group on Y, formula 1, preferably comprises at least one halogen atom, further preferably at least two halogen atoms, further preferably at least three halogen atoms, still further preferably at least four halogen atoms. In a most preferred embodiment variant, the haloalkyl group is completely halogenated.

In a certain preferred embodiment Y is a pentyl group, further preferably a butyl group, further preferably a propyl group.

In another preferred embodiment Y is a halopentyl group, further preferably a halobutyl group, further preferably a halopropyl group.

The halogen is preferably selected from the group of fluorine and chlorine, further preferably it is fluorine. Through the substitution with fluorine the viscosity of the electrolyte composition is lowered still further. This results in a higher conductivity of the electrolyte composition. Furthermore, fluorine increases the electrochemical stability of the electrolyte composition.

Preferably, Y is not an aryl group, in particular not a phenyl group or naphthyl group. Groups having a large spherical molecular geometry result in an unfavorable arrangement of the ions in the electric field.

According to the present invention, the counterion is not a metal ion, in particularly not an alkali metal ion, especially not a lithium, sodium or potassium ion. Reactive metal ions may result at the surface of the electrolyte solution in undesirable reactions. Furthermore, metal ions intercalate with the electrodes.

In particularly preferred embodiment variants, the counterion Z+ is selected from the group comprising ammonium, tetraalkylammonium, cyclic ammonium, spiro ammonium or imidazolium derivatives according to formula 2-4. Especially the spiro ammonium ions are characterized by a particularly high ion conductivity, wherein at the same time the electrochemical stability is very good. In combination with the bicyclic triolborate anions they result in excellent conducting salts and electrolyte compositions.

In a certain preferred embodiment, the counterion is a tetraalkylammonium cation, wherein the four groups of the tetraalkylammonium cation independently of each other are preferably an alkyl group with 1-6 carbon atoms, further preferably an alkyl group with 1-5 carbon atoms, further preferably an alkyl group with 1-4 carbon atoms, further preferably an alkyl group with 1-3 carbon atoms, further preferably an alkyl group with 1-2 carbon atoms, further preferably a methyl group, or a haloalkyl group, further preferably a haloalkyl group with 1-12 carbon atoms, further preferably a haloalkyl group with 1-6 carbon atoms, further preferably a haloalkyl group with 1-5 carbon atoms, further preferably a haloalkyl group with 1-4 carbon atoms, further preferably a haloalkyl group with 1-3 carbon atoms, further preferably a haloalkyl group with 1-2 carbon atoms, further preferably a halomethyl group. Particularly preferably, the tetraalkylammonium cation is a tetramethylammonium cation, a tetraethylammonium cation or a tetrabutylammonium cation. It may also contain combinations of the different alkyl groups, wherein also at least one hydrogen atom may be contained.

The counterion has a stable spherical molecular geometry. So, the electrochemical stability of the electrolyte is improved. A spherical molecular geometry of the counterion also improves the arrangement of the ions in the electric field, whereby a better charge distribution is achieved. In particularly, the counterion does not comprise undesirable chemical reactivities and, for example, does not react with the surface of the electrodes. The materials of the electrodes are not attacked by the counterion, whereby an improved long-term behavior of the energy storage facility is achieved. Furthermore, the counterion reduces the melting temperature of the electrolyte composition which reduces the viscosity, whereby the conductivity is increased. Furthermore, the molecular geometry results in a steric shielding of the charge center against Coulomb interactions. This favors the arrangement of the ions in the electric field, resulting in a better charge distribution.

In a certain preferred embodiment, X is carbon substituted with a methyl group, Y is a methyl group, the counterion is preferably ammonium, further preferably tetramethylammonium, further preferably tetraethylammonium, further preferably tetrabutylammonium, or it contains combinations of the different alkyl groups, wherein at least one hydrogen atom is also contained.

In another preferred embodiment, X is carbon substituted with a methyl group, Y is a butyl group, the counterion is preferably ammonium, further preferably tetramethylammonium, further preferably tetraethylammonium, further preferably tetrabutylammonium.

In another preferred embodiment, X is a carbon substituted with a methyl group, Y is a haloalkyl group, preferably fluoroalkyl, further preferably alkyl chains with 1-7 carbon atoms which are substituted with one or more fluorine atoms, up to perfluorinated ones, the counterion is ammonium, further preferably tetramethylammonium, further preferably tetraethylarmmonium, further preferably tetrabutylammonium.

According to the present invention, the electrolyte composition for an energy storage facility comprises a bicyclic triolborate and 0-75% by volume of one or more solvents.

Preferably, the proportion of solvent in the electrolyte composition is at most 75% by volume, further preferably at most 50% by volume, further preferably at most 25% by volume, further preferably at most 10% by volume, further preferably at most 5% by volume, further preferably at most 1% by volume. It may also be 0% by volume, i.e., it is free of solvents.

The electrolyte composition may have an electrolyte concentration of at least 25% by volume. It is most preferred, when the electrolyte composition consists of the bicyclic triolborate.

Preferably, the electrolyte composition has a conductivity of at least 100 mS/cm, further preferably of at least 500 mS/cm, further preferably of at least 1000 mS/cm, still further preferably of at least 1200 mS/cm. Here, the measurements of the conductivity are conducted according to the standard method which is described in Barsoukov, Evgenij and J. Ross MacDonald: *"Impedance Spectroscopy: Theory, Experiment, and Applications."*, John Wiley and Sons. Inc., 2005: chapter 3, page 129, *"Measuring Techniques and Data Analysis"*, page 129, chapter 3.1 *"Impedance Measurement Techniques"*, Michael C. H. McKubreDigby, D. Macdonald, page 168, chapter 3.2 *"Commercially Available Impedance Measurement Systems"*, Brian Sayers, chapter 4, page 469, chapter 4.5.3 *"Impedance Behavior of Electrochemical Supercapacitors and Porous Electrodes"*, Brian Conway, as well as, particularly appropriate, Tobias Herzig, Christian Schreiner, Hartmut Bruglachner, Steffen Jordan, Michael Schmidt, and Heiner J. Gores, J. Chem, Eng. Data 2008, 53, 434-438: *"Temperature and Concentration Dependence of Conductivities of Some New Semichelatoborates in Acetonitrile and Comparison with Other Borates"*.

Preferably, the electrolyte composition has a viscosity of at most 3 mPa·s, further preferably at most 1 mPa·s, further preferably at most 0.5 mPa·s, still further preferably at most 0.3 mPa·s. A low viscosity of the electrolyte composition results in an increased contact interaction with the electrode surface with the ions of the electrolyte composition. An increased contact interaction with the electrode surface reduces the internal resistance of the capacitor.

Preferably, the electrolyte composition has an electrolyte concentration of at least 0.1 M, further preferably of at least 0.3 M, further preferably of at least 0.5 M, still further preferably of at least 1 M. A higher electrolyte concentration increases the conductivity of the electrolyte composition. An increased conductivity of the electrolyte composition increases the power of the capacitor.

The solvent may be acetonitrile. Preferably, the solvent is selected from the group of organic solvents such as tetrahydrofuran, γ-butyrolactone or organic carboxylic acid esters such as dialkyl carbonates $(RO)_2CO$, $(RO)(R'O)CO$ or cyclic alkyl carbonates such as ethylene or propylene carbonate and mixtures of two or more thereof.

Preferably, the proportion of acetonitrile in the electrolyte composition is at most 50% by volume, further preferably at most 25% by volume, further preferably at most 10% by volume, further preferably at most 5% by volume, further preferably at most 1% by volume, wherein still further preferably the electrolyte composition is free of acetonitrile.

Preferably, the proportion of dialkyl carbonate is at most 50% by volume, further preferably at most 25% by volume, further preferably at most 10% by volume, further preferably at most 5% by volume, further preferably at most 1% by volume, wherein still further preferably the electrolyte composition is free of dialkyl carbonate.

Most preferably, the electrolyte composition is free of water. Here, free of water means a content of less than 5% by volume, in particularly less than 2% by volume, preferably less than 1% by volume, most preferably 0% by volume of water. In particular, the data refers to water which is added as a composition component, and it does not include residual moisture which is optionally contained in the other solvents.

Preferably, the electrolyte composition has a melting point of at most 100° C., further preferably of at most 0° C., further preferably of at most -2° C., further preferably of at most -10° C., still further preferably of at most -20° C. A low melting temperature results in a lower viscosity.

With the bicyclic triolborates used it is possible that an electrolyte composition according to the present invention only requires a low amount of solvent or can be used also without any solvent, and therefore it comprises a very low proportion of solvate shells or it is even free of solvate shells. A lower proportion of solvate shells improves the contact interaction of the ions with the electrode surface. And to an improved penetration of the ions into the pores of the fractal surface of the electrode. As a result of this, the capacity of the capacitor is increased.

According to the present invention is, in particularly, also a capacitor containing an electrolyte composition comprising a bicyclic triolborate.

Preferably, the voltage window of the capacitor has a width of at least 2.0 V, further preferably 2.5 V, further preferably of at least 3.0 V, still further preferably of at least 3.5 V. A large voltage window of the capacitor improves the electric strength of the capacitor.

Preferably, the capacitor has a specific energy of at least 1.5 mW·h/g, further preferably of at least 2.5 mW·h/g, further preferably of at least 3.0 mW·h/g, still further preferably of at least 3.5 mW, h/g.

Preferably, the capacitor has a capacity of at least 10° F., further preferably of at least 100° F., further preferably of at least 500° F., still further preferably of at least 1000° F.

Preferably, the capacitor has a specific power of at least 0.5 W/g, further preferably of at least 1.0 W/g, further preferably of at least 2.0 W/g, still further preferably of at least 5.0 W/g, further preferably of at least 10.0 W/g.

Preferably, the capacitor has an internal resistance of at most 20 mΩ, further preferably at most 10 mΩ, further preferably at most 5 mΩ, further preferably at most 1.5 mΩ, further preferably at most 0.5 mΩ.

Preferably, the lower limit of the application temperature range of the capacitor is at least -20° C., further preferably at least -40° C., further preferably at least -80° C., further preferably at least -100° C.

Preferably, the upper limit of the application temperature range of the capacitor is at least 40° C., further preferably at least 70° C., further preferably at least $10^{00°}$ C. A high temperature range of the capacitor expands the operational temperature range of the capacitor. As a result of this, the robustness of the capacitor is increased.

Preferably, the electrolyte composition is used in electrochemical double-layer capacitors.

Preferably, the electrolyte composition is used in electrochemical supercapacitors, in particularly for electric motors.

DETAILED DESCRIPTION OF THE INVENTION

EXAMPLES

Figure 1:
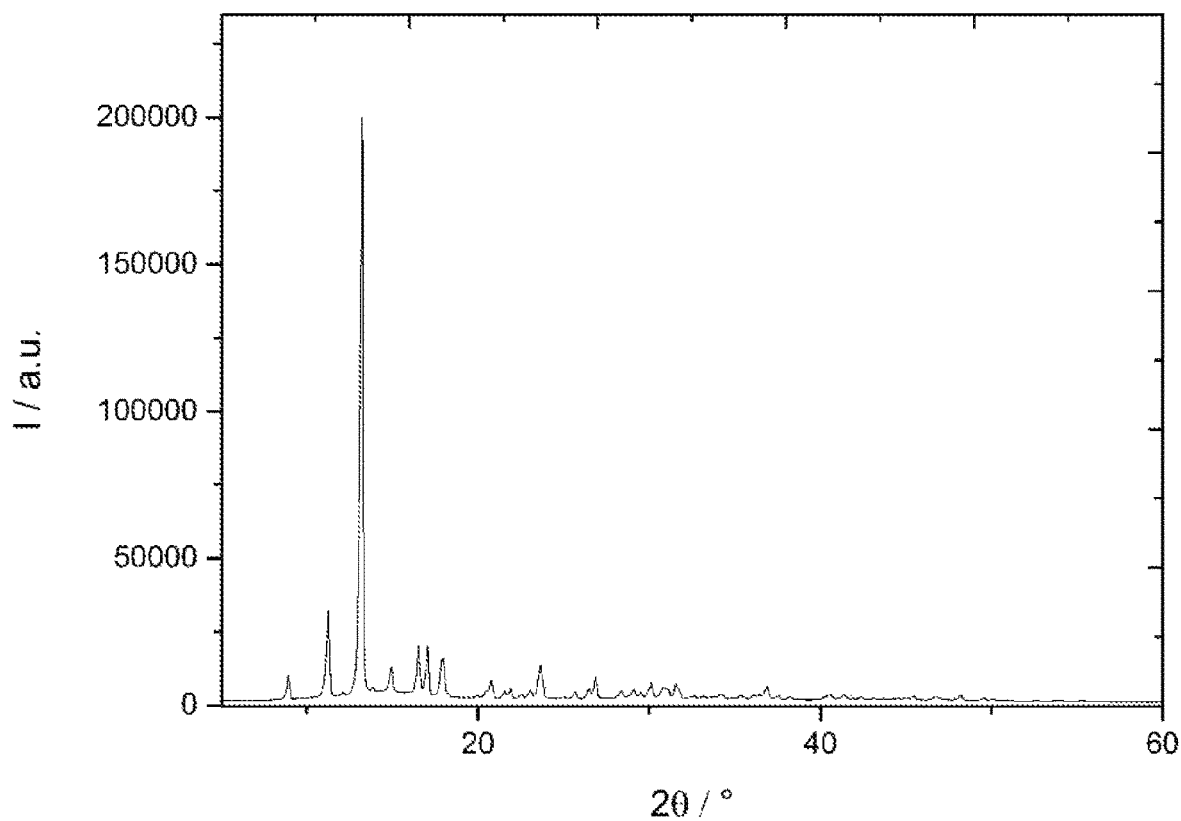
FIG. 1 shows an X-ray powder diffractogram of structure (A). On the x-axis the angle of diffraction 2θ is shown in degree (°) and on the y-axis the intensity is shown in arbitrary units (a. u.).

The present invention is illustrated by the following examples, wherein the invention is not limited thereto.

Synthesis of Bicyclic Triolborates According to the Present Invention

The bicyclic triolborates according to the present invention of the examples 1-5 which have the structural formulas (B), (C), (D), (F) and (G) were each synthesized by ion exchange reactions from the lithium triolborate salt of the structural formula (A) or the structural formula (F). These triolborates are shown in table 1.

TABLE 1

| Example | Name | Structural formula |
|---|---|---|
| Educt 1 | lithium-1,4-dimethyl-2,6,7-trioxa-1-boratobicyclo-[2.2.2]-octane | (A) |
| 1 | tetramethyl-ammonium-1,4-dimethyl-2,6,7-trioxa-1-boratobicyclo-[2.2.2]-octane | (B) |
| 2 | tetraethyl-ammonium-1,4-dimethyl-2,6,7-trioxa-1-boratobicyclo-[2.2.2]-octane | (C) |
| 3 | tetrabutyl-ammonium-1,4-dimethyl-2,6,7-trioxa-1-boratobicyclo-[2.2.2]-octane | (D) |
| 4 | 1-ethyl-3-methylimidazolium-1,4-dimethyl-2,6,7-trioxa-1-boratobicyclo-[2.2.2]-octane | (E) |

TABLE 1-continued

| Example | Name | Structural formula |
|---|---|---|
| Educt 2 | lithium-1-butyl-4-methyl-2,6,7-trioxa-1-boratobicyclo-[2.2.2]-octane | (F) |
| 5 | tetraethyl-ammonium-1-butyl-4-methyl-2,6,7-trioxa-1-boratobicyclo-[2.2.2]-octane | (G) |

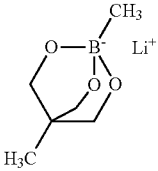

The substance having the structural formula (A) as starting substance for the ion exchange reactions was synthesized as described below. At −78° C., to a solution of 50 mmol of triisopropyl borate (a1) in 100 ml tetrahydrofuran 50 mmcl of 1.6 molar methyllithium solution (a2) were added. At first the reaction solution was stirred for 30 minutes at −78° C. and subsequently for further eight hours at room temperature. Thereafter 50 mmol of 1,1,1-tris(hydroxymethyl)ethane (a3) were added. The resulting mixture was heated to 60° C. for one hour. After the reaction was completed, the solution was given into one liter of water-free acetone, and the precipitate was filtered, washed with acetone and dried in high vacuum. 6.78 g (45 mmol) of the substance having the structural formula (A) were obtained.

1.2 Example 1

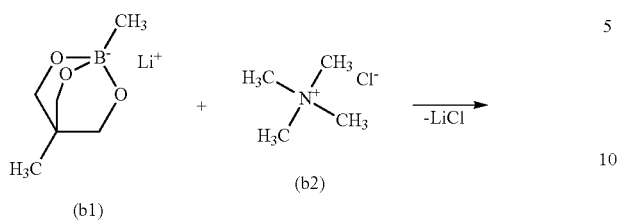

In example 1 the substance having the structural formula (B) was synthesized as described below. Under protective gas 10.32 mmol of lithium-1,4-dimethyl-2,6,7-trioxa-1-boratobicyclo-[2.2.2]-octane (b1) and 10.32 mmol of tetramethylammonium chloride (b2) were each dissolved in 10 ml water-free methanol. Subsequently, at 0° C. under protective gas and stirring both solutions were combined and stirred at room temperature for further two hours. After the reaction was completed, the reaction solution was concentrated to dryness. To the residue 20 ml water-free dichloromethane were added, and it was swirled. The supernatant was decanted, and subsequently it was concentrated. 1.05 g (4.84 mmol) of the substance having the structural formula (B) were obtained.

1.3 Example 2

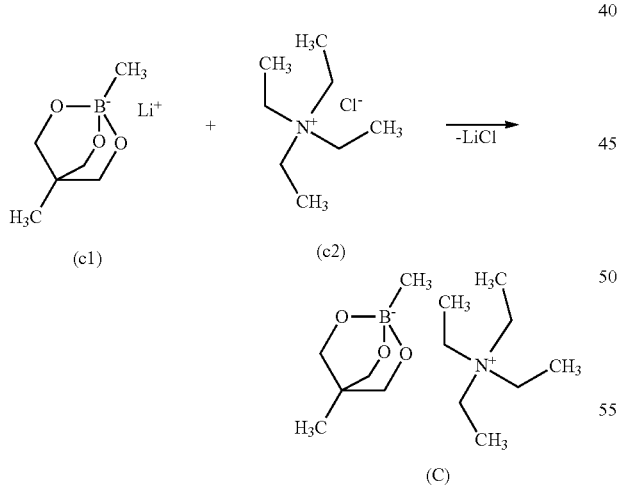

In example 2, the substance having the structural formula (C) was synthesized as described below. Under protective gas 10.32 mmol of lithium-1,4-dimethyl-2,6,7-trioxa-1-boratobicyclo-[2.2.2]-octane (c1) and 10.32 mmol of tetraethylammonium chloride (c2) were each dissolved in 10 ml water-free methanol. Subsequently, at 0° C. under protective gas and stirring both solutions were combined and stirred at room temperature for further two hours. After the reaction was completed, the reaction solution was concentrated to dryness. To the residue 20 ml water-free dichloromethane were added, and it was swirled. The supernatant was decanted, and subsequently it was concentrated. 1.12 g (4.10 mmol) of the substance having the structural formula (C) were obtained.

1.4 Example 3

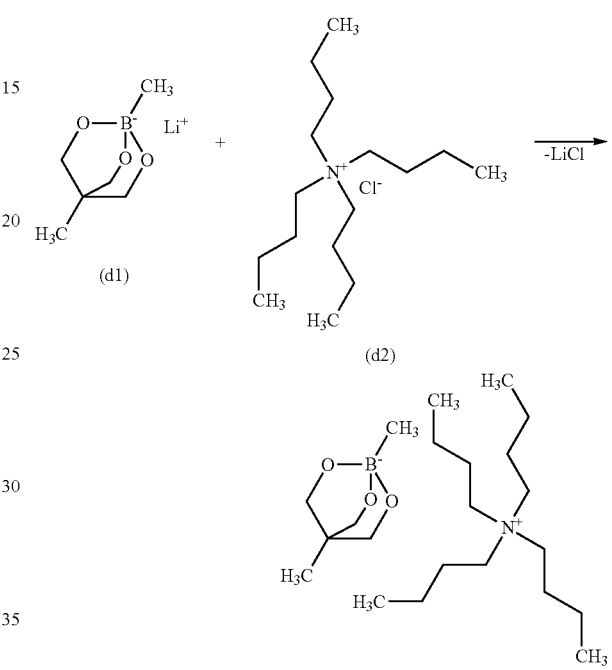

In example 3, the substance having the structural formula (D) was synthesized as described below. 10.34 mmol of lithium-1,4-dimethyl-2,6,7-trioxa-1-boratobicyclo-[2.2.2]-octane (d1) were dissolved in 10 ml water-free methanol. Subsequently, 13.34 mmol of tetrabutylammonium chloride, dissolved in 10 ml water-free methanol, (d2) were added at 0° C., and it was stirred for further two hours at room temperature. After the reaction was completed, the solution was extracted with dichloromethane, and the combined extracts were concentrated. 1.35 g (3.50 mmol) of the substance having the structural formula (D) were obtained.

1.5 Example 4

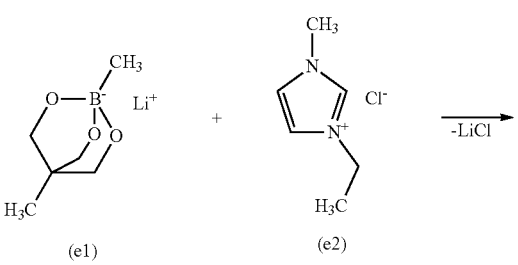

-continued

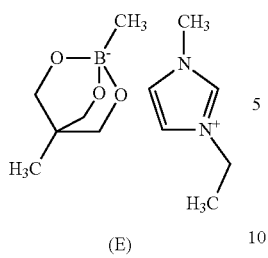

(E)

In example 4, the substance having the structural formula (E) was synthesized as described below. 4.98 mmol of lithium-1,4-dimethyl-2,6,7-trioxa-1-boratobicyclo-[2.2.2]-octane (e1) were dissolved in 10 ml water-free methanol. Subsequently, 4.98 mmol of 1-ethyl-3-methylimidazolium chloride, dissolved in 10 ml water-free methanol, were added at 0° C., and it was stirred for further two hours at room temperature. After the reaction was completed, the reaction solution was concentrated to dryness. To the residue 20 ml water-free dichloromethane were added, and it was swirled. The supernatant was decanted, and subsequently it was concentrated. 0.39 g (1.53 mmol) of the substance having the structural formula (E) were obtained.

1.6 Educt 2

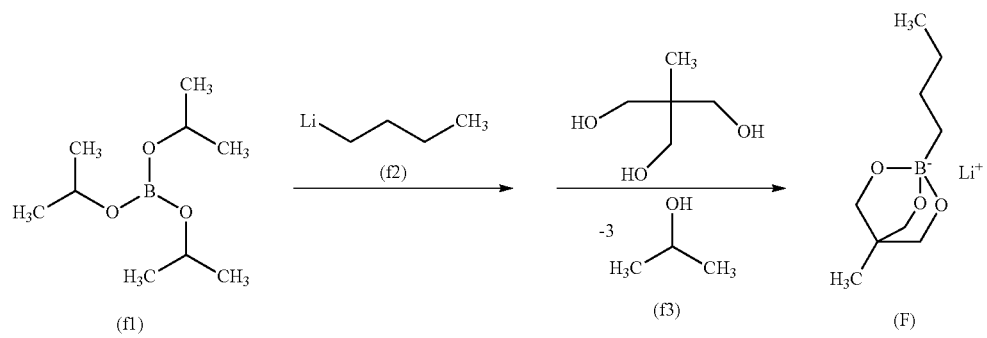

As further starting substance for ion exchange reactions, the substance having the structural formula (F) was used which has been prepared as described below. At −78° C., to a solution of 50 mmol of triisopropyl borate (f1) in 100 ml tetrahydrofuran 50 mmol of 1.6 molar butyllithium solution (f2) were added. At first the reaction solution was stirred for 30 minutes at −78° C. and subsequently for further eight hours at room temperature. Thereafter 50 mmol of 1,1,1-tris(hydroxymethyl)ethane (f3) were added. The resulting mixture was heated to 60° C. for one hour. After the reaction was completed, the solution was given into one liter of water-free acetone, and the precipitate was filtered, washed with acetone and dried in high vacuum. 9.2 g (48 mmol) of the substance having the structural formula (F) were obtained.

1.7 Example 5

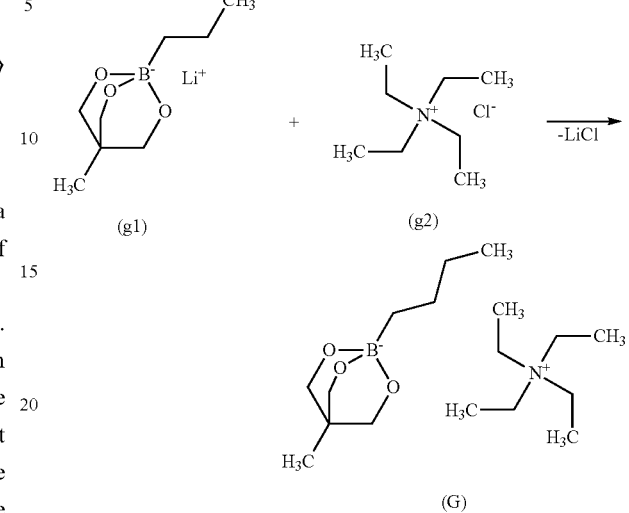

In example 5, the substance having the structural formula (G) was synthesized as described below. At 0° C., to a solution of 10.81 mmol of lithium-1-butyl-4-methyl-2,6,7-trioxa-1-boratobicyclo-[2.2.2]-octane (g1) in 5 ml methanol a solution of 10.81 mmol of tetraethylammonium chloride (g2) in 5 ml methanol was added. The solution was stirred for further two hours at room temperature. Subsequently, it was extracted with dichloromethane. The combined extracts were concentrated in a rotary evaporator and subsequently dried in fine vacuum. 1 g (3.89 mmol) of the substance having the structural formula (G) was obtained.

Nuclear Magnetic Resonance Spectroscopy

The lithium triolborate salts as educts and the substances of the examples 1 to 5 were characterized by means of nuclear magnetic resonance spectroscopy. $^1$H-NMR, $^{13}$C-NMR and $^{11}$B-NMR measurements at 300 K and 500 MHz were conducted with a DRX500 spectrometer with deuterated dimethyl sulfoxide. Table 2 shows the peaks of the substances (A), (B), (C), (D), (E), (F) and (G) which were measured in the obtained NMR spectra.

TABLE 2

| NMR measur. | Peaks [ppm] (A) | Peaks [ppm] (B) | Peaks [ppm] (C) | Peaks [ppm] (D) | Peaks [ppm] (E) | Peaks [ppm] (F) | Peaks [ppm] (G) |
|---|---|---|---|---|---|---|---|
| $^1$H-NMR | −0.72 (s, 3H); 0.38 (s, 3H); 3.42 (s, 6H) | −0.75 (s, 3H); 3.10 (s, 3H); 0.38 (s, 3H); 3.42 (s, 6H) | −0.75 (s, 3H); 0.38 (s, 3H); 1.17 (tt, 3H); 3.22 (q, 2H); 3.41 (s, 6H) | −0.78 (s, 3H); 0.37 (s, 3H); 0.94 (t, 12H); 1.32 (m, 8H); 1.57 (m, 8H); 3.16 (t, 8H); 3.41 (s, 6H) | −0.62 (s, 3H); 0.46 (s, 3H); 1.46 (t, 3H); 3.48 (s, 3H); 3.91 (s, 6H); 4.27 (q, 2H); 7.82 (dd, 1H); 7.91 (dd, 1H); 9.53 (s, 1H) | −0.22 (t, 2H); 0.37 (s, 3H); 0.76 (t, 2H); 0.92-1.05 (m, 3H); 1.06-1.17 (m, 2H); 3.40 (s, 6H) | 1.17 (tt 3H); 3.21 (q, 2H); −0.20 (t, 2H); 0.37 (s, 3H); 0.76 (t, 2H); 0.99-1.06 (m, 3H); 1.07-1.13 (m, 2H); 3.43 (s, 6H) |
| $^{13}$C-NMR | 5.14; 16.30; 33.88; 73.25 | 54.34; 16.29; 33.97; 73.23 | 7.09; 51.43; 4.76; 16.23; 33.88; 73.13 | 13.45; 19.19; 23.07; 57.55; 16.34; 48.40; 73.39 | 15.17; 16.31; 34.11; 44.01; 54.97; 63.89; 72.52; 121.97; 123.54; 136.58 | 14.45; 16.38; 26.53; 28.55; 73.29 | 7.07; 51.44; 14.42; 16.45; 26.45; 28.46; 72.96 |
| $^{11}$B-NMR | 3.11 | 2.32 | 5.60 | 5.42 | 3.11 | 5.81 | 7.25 |

X-Ray Powder Diffractometry

Substance (A) was characterized by X-ray powder diffractometry. The measurement was conducted with copper radiation (1.55060 Å), germanium (111) monochromator and scintillation counter from 5.005° to 67,145°. The obtained diffractogram is shown in FIG. 1. FIG. 1 shows reflexes at small angles. This indicates that substance (A) has a large unit cell.

Structural Single Crystal X-Ray Analysis

Figure 2:
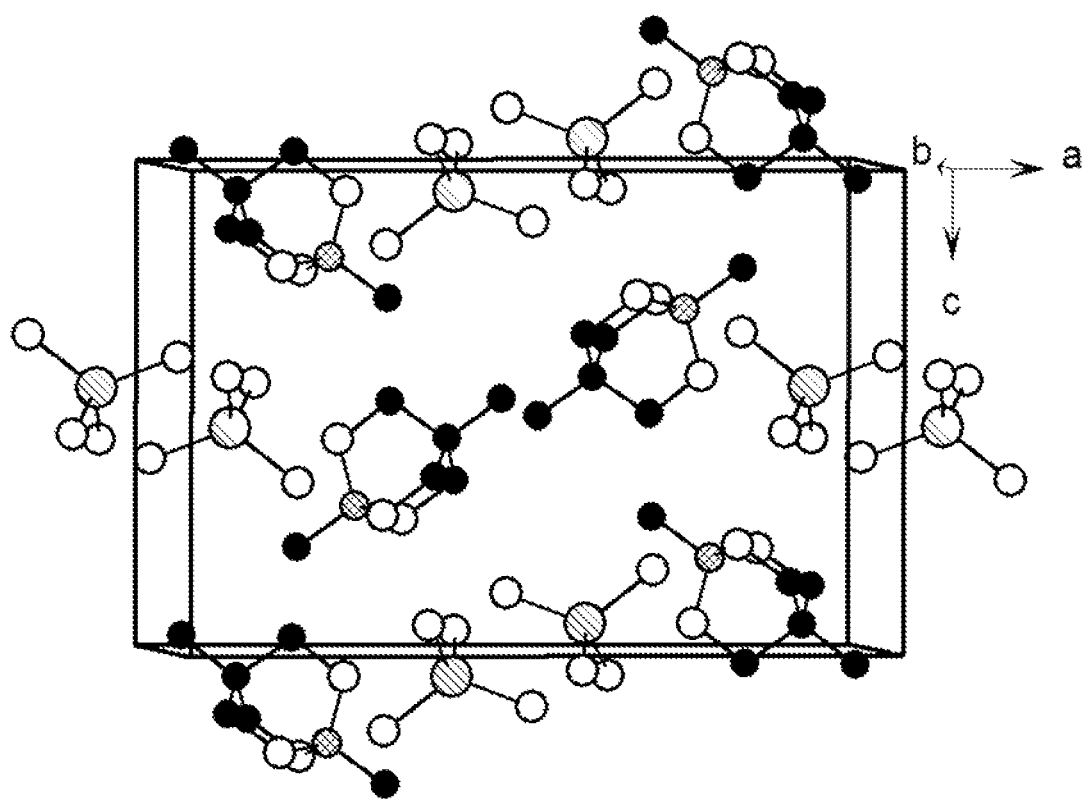
FIG. 2 shows a unit cell of structure (A)*4 $H_2O$.
Figure 3:
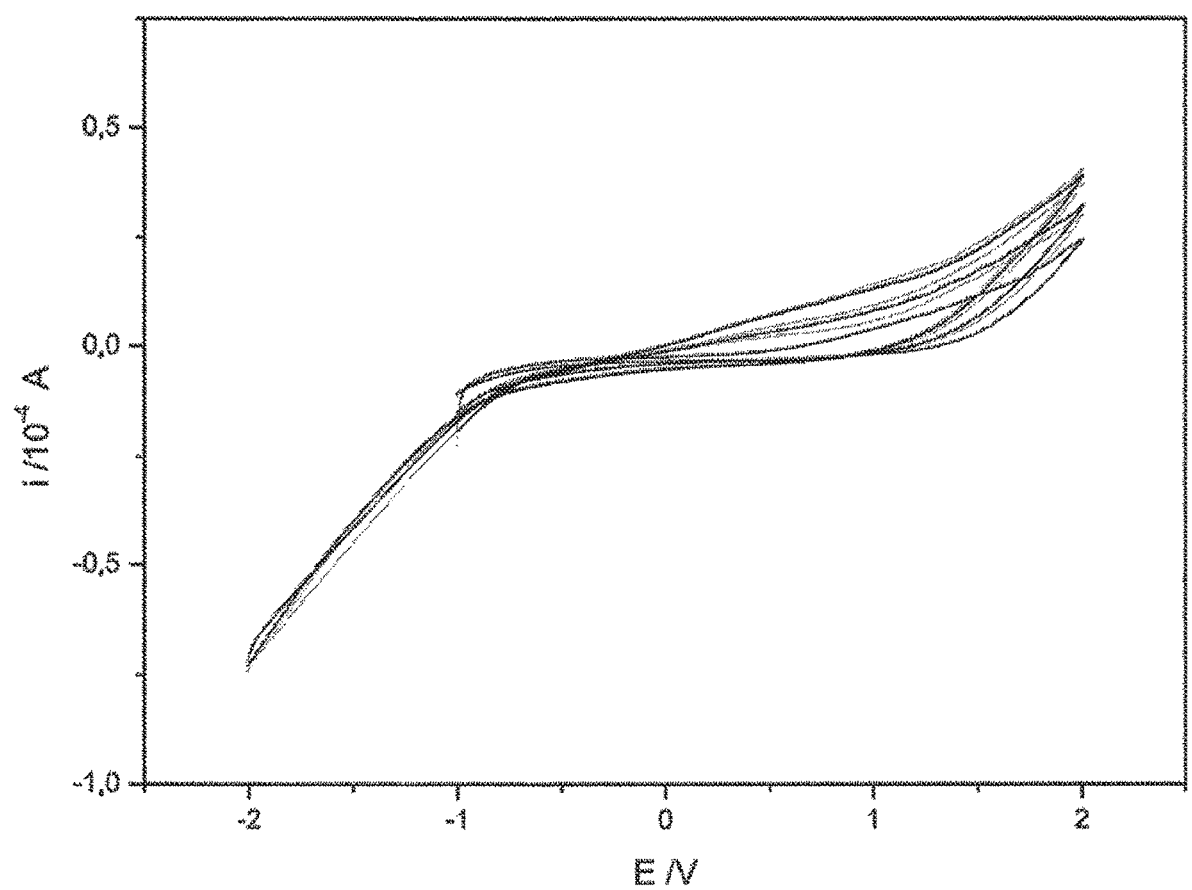
FIG. 3 shows cyclic voltammetry diagrams of structure (D) in acetonitrile, wherein different scanning rates have been used. On the x-axis the voltage is shown in volt (V) and on the y-axis the strength of current is shown in $10^{-4}$ ampere ($10^{-4}$ A).

Substance (A) was characterized by structural single crystal X-ray analysis. The measurement was conducted with molybdenum radiation (0.71073 Å) at 155 K. The crystals selected for this contained additional water of crystallization. The obtained unit cell is shown in FIG. 2. For a better overview, here, the hydrogen atoms are not shown.

In FIG. 2, carbon atoms are shown in black, oxygen atoms are shown in white, boron atoms are shown checkered and lithium ions are shown striped. FIG. 2 shows that the cations of substance (A) in the crystal structure are surrounded by water molecules in a tetrahedral manner. The anions of substance (A) are arranged in layers which are stacked along the b-axis of the unit cell (FIG. 2).

Cyclic Voltammetry Measurement

In example 3, substance (D) was characterized by cyclic voltammetry measurement. For the measurement a glassy carbon electrode was used as working electrode, a platinum electrode was used as counter electrode and a silver/silver chloride electrode was used as reference electrode. One cycle each with a scanning rate of 10 mV/s, 20 mV/s and 50 mV/s, and 50 cycles with a scanning rate of 20 mV/s were conducted from −1 to 2 V and −2 to 2 V with a solution of 50 mg of substance (D) in 100 ml acetonitrile under constant stirring. Substance (D) exhibits a high electrochemical stability, because the cycles at different scanning rates in the voltage range of between −2 and 2 V are closing.

What is claimed is:

1. A bicyclic triolborate having the following structural formula

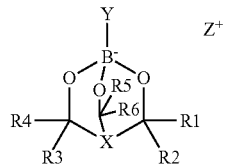

wherein R1 to R6 independently of each other are selected from hydrogen, hydroxy, nitro, halide group or substituted or unsubstituted hydroxyalkyl, alkyl, isoalkyl, alkenyl, aryl, heteroaryl, cycloalkyl, haloalkyl, alkoxy, alkoxycarbonyl, phenyl or naphthyl group;

wherein X is selected from nitrogen and carbon, wherein the carbon is substituted with hydrogen halide group or substituted or unsubstituted hydroxyalkyl, alkoxycarbonyl group;

wherein Y is selected from hydrogen, or substituted or unsubstituted hydroxyalkyl, haloalkyl, alkoxy, or alkoxycarbonyl group;

wherein Z$^+$ a) is an ion of the general formula R'$_n$A$^+$ with n=1-4, wherein in the counterion Z$^+$ A is selected from the group consisting of nitrogen and phosphorus and R' is selected from the group consisting of hydrogen, linear or branched alkyl groups or linear or branched haloalkyl groups; or b) is selected from the group consisting of ammonium, tetraalkylammonium, cyclic ammonium, spiro ammonium, imidazolium,

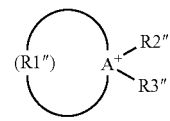

with R1"=bridging cyclic group, R2", R3"=two alkyl groups or one hydrogen and one alkyl group and

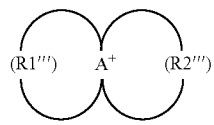

with R1''', R2'''=bridging cyclic alkyl group.

2. The triolborate according to claim 1, wherein R1 to R6 independently of each other are selected from the group consisting of:
   an alkyl group with 1-6 carbon atoms, and
   a haloalkyl group with 1-6 carbon atoms.

3. The triolborate according to claim 1, wherein Y is a haloalkyl group.

4. The triolborate according to claim 1, wherein Y contains at least one fluorine atom.

5. An electrolyte composition for an energy storage facility comprising a bicyclic triolborate according to claim 1 and 0-75% by volume of one or more solvents.

6. The electrolyte composition according to claim 5, wherein the electrolyte solution is free of acetonitrile.

7. The electrolyte composition according to claim 6, wherein the melting temperature of the electrolyte composition is lower than 100° C.

8. A capacitor containing an electrolyte composition comprising the bicyclic triolborate according to claim 1.

9. The capacitor according to claim 8, wherein the electric strength of the capacitor is at least 2 V.

10. The capacitor according to claim 8, wherein the charge capacity of the capacitor is at least 10 F.

11. The capacitor according to claim 8, wherein the voltage window of the capacitor is in a range of 2 V to 4 V.

12. The capacitor according to claim 8, wherein the internal resistance of the capacitor is lower than 20 mΩ.

* * * * *